United States Patent
Lorrain-Hale et al.

(10) Patent No.: US 12,217,171 B2
(45) Date of Patent: Feb. 4, 2025

(54) ENGAGEMENT SIGNAL GENERATION AND ANALYSIS

(71) Applicant: Microsoft Technology Licensing, LLC, Redmond, WA (US)

(72) Inventors: Theo Lorrain-Hale, Boston, MA (US); William D. Tierney, Swampscott, MA (US); Feng Liu, Winchester, MA (US); Douglas Lane Milvaney, Somerville, MA (US); Manon Knoertzer, Winthrop, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 945 days.

(21) Appl. No.: 17/245,948

(22) Filed: Apr. 30, 2021

(65) Prior Publication Data
US 2022/0351034 A1   Nov. 3, 2022

(51) Int. Cl.
*G06N 3/00* (2023.01)
*G06N 3/04* (2023.01)
(Continued)

(52) U.S. Cl.
CPC ............. *G06N 3/08* (2013.01); *G06N 3/04* (2013.01); *G06F 18/2431* (2023.01); *G06F 18/40* (2023.01)

(58) Field of Classification Search
CPC ....... G10L 19/00; G10L 19/005; G10L 25/27; G10L 25/30; G10L 15/16; G10L 15/02; G10L 15/063; G10L 15/12; G06F 40/30; G06F 40/211; G06F 40/268; G06F 40/40253; G06F 40/284
See application file for complete search history.

(56) References Cited

U.S. PATENT DOCUMENTS

| 10,853,220 B2 | 12/2020 | Doggett et al. |
| 2018/0113576 A1 * | 4/2018 | Bauchot ............... G06F 40/166 |

(Continued)

OTHER PUBLICATIONS

Office Action Received for European Application No. 22719447.9, mailed on Dec. 7, 2023, 3 Pages.
(Continued)

*Primary Examiner* — Vu B Hang

(57) ABSTRACT

Engagement signals may be generated and analyzed based on user interactions with documents, particularly in a collaboration environment. The user interactions may generate raw collaboration signals that may be received and processed into cleaned collaboration signals. For example, noise may be removed from the raw collaboration signals to generate the cleaned collaboration signals. The cleaned collaboration signals may be grouped into engagement signals, where each engagement signal represents an individual event or engagement event of the user with the document. The grouping may be based on boundary signals, time frames, and/or any other reasonable limiting element. Each of the engagement signals may be classified into one of several engagement types based on the cleaned collaboration signals in the engagement signal. The engagement signals may then be analyzed to make determinations, recommendations, or the like regarding one or more users of the document, the document content, or the like.

20 Claims, 8 Drawing Sheets

(51) Int. Cl.
  *G06N 3/08* (2023.01)
  *G06F 18/2431* (2023.01)
  *G06F 18/40* (2023.01)

(56) References Cited

U.S. PATENT DOCUMENTS

2020/0104697 A1* 4/2020 Bhatia .................... G06N 3/04
2021/0118546 A1 4/2021 Ramakrishnan
2022/0351034 A1 11/2022 Lorrain-hale et al.

OTHER PUBLICATIONS

"International Search Report and Written Opinion Issued in PCT Application No. PCT/US22/023569", Mailed Date: Jun. 28, 2022, 13 Pages.

* cited by examiner

Document B Information

You distributed Document B at 9:15AM on 4/06/21.

As of 4/15/21 at 11:52AM, 37 people have engaged with Document B.

Recommendations:
* 31% of viewers exit the document after reaching slide 3 – consider revising slide 3. Some reasons viewers may exit is because the information is too complex, offensive, or boring. Analysis indicates the data on slide 3 may be offensive because it contains opinions. Consider revising slide 3 to be factual rather than based on opinion to keep viewers interested.

* 15% of viewers spend more than 10 minutes on slide 6 – consider revising slide 6. The viewers may be getting stuck on slide 6 because the content is complex. Consider adding additional explanation to slide 6 and/or splitting the information on slide 6 into two or more slides to help viewers understand the content.

Would you like me to continue to track/update this data?

[ Yes ]   [ No ]

FIG. 6

(12) United States Patent
US 12,217,171 B2

ENGAGEMENT SIGNAL GENERATION AND ANALYSIS

BACKGROUND

Content generation applications such as word processing applications, spreadsheet applications, presentation applications, and the like allow users to generate content, collaborate with others, and share the content. Working with content generation applications in a shared or collaborative environment can be useful to share ideas and information. While collaborating or sharing, the engagement of others within a document is not always clear. This disclosure addresses the engagement of individuals with a document in a shared or collaboration environment.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for generating and analyzing engagement signals. The computer-implemented method may include receiving raw collaboration signals generated based on a user interacting with a document. The raw collaboration signals may be processed into cleaned collaboration signals. The cleaned collaboration signals may be grouped into engagement signals, each engagement signal representing an individual event. Each of the engagement signals may be classified into one of a number of engagement types based on the cleaned collaboration signals in the engagement signal. Other embodiments of this aspect include corresponding computer systems, apparatus, and computer programs recorded on one or more computer storage devices, each configured to perform the actions of the methods.

Implementations may include one or more of the following features. In some embodiments, the raw collaboration signals may include at least one of document open signals, window minimize signals, window focus signals, document close signals, window maximize signals, input activity signals, or a combination thereof. In some embodiments, processing the raw collaboration signals into cleaned collaboration signals may include aggregating the raw collaboration signals to remove noise. In some embodiments, grouping the cleaned collaboration signals into engagement signals may include identifying boundary signals in the cleaned collaboration signals that indicate a beginning and an end of an event, and combining the cleaned collaboration signals occurring between the boundary signals into the engagement signal. In some embodiments, grouping the cleaned collaboration signals into engagement signals may include providing the cleaned collaboration signals to a neural network configured to identify boundary signals for events, and receiving boundary signals that indicate a beginning and end of an event as output from the neural network. In some embodiments, classifying each of the engagement signals into one of the engagement types may include providing each of the engagement signals into an advanced intelligence classifier, and receiving an engagement type as output from the advanced intelligence classifier for each of the engagement signals. The engagement types may include editing, viewing, reviewing, and authoring. In some embodiments, the computer-implemented method may further include assigning a collaboration role to the user for the document based on the classified engagement signals. In some embodiments, the computer-implemented method may include providing recommendations to a contributor of the document based on analyzing classified engagement signals of a number of users of the document. In some embodiments, the computer-implemented method may include sending a notification of an action related to the document to the user of the document based at least in part on the classified engagement signals and a collaboration role of the user. Implementations of the described techniques may include hardware, a method or process, or computer software on a computer-accessible medium.

BRIEF DESCRIPTION OF THE DRAWINGS

Many aspects of the disclosure can be better understood with reference to the following drawings. The components in the drawings are not necessarily drawn to scale. Some components or operations may not be separated into different blocks or may be combined into a single block for the purposes of discussion of some embodiments. Moreover, in the drawings, like reference numerals designate corresponding parts throughout the several views. While several embodiments are described in connection with these drawings, the disclosure is not limited to the embodiments disclosed herein. The technology is amenable to various modifications and alternative forms. The disclosure and figures herein are intended to provide a description of certain embodiments, and the intent is to cover all alternatives, modifications, and equivalents.

FIG. 6 illustrates yet another exemplary graphical user interface, according to some embodiments.

DETAILED DESCRIPTION

This disclosure is generally related to generating and analyzing engagement signals. The engagement signals may represent the engagement of a user with a document. The engagement of a user with a document may be of particular interest within a collaboration environment. For example, within a collaboration environment, it may be beneficial to know which users have engaged with a document, and the type and extent of the users' engagement. Further, it may be useful to analyze the engagements and generate insights into both individual user interactions with one or more documents as well as into a collective group of users' interactions.

The described system captures the raw signals of a user with respect to a document. The raw signals can be useful to identify the engagement of the user with the document, but the raw signals may be noisy and contain far too much unnecessary or irrelevant information. The raw signals can be processed to generate engagement signals that provide helpful information about the user's interaction with the document. The engagement signals can be analyzed to make determinations and decisions about the user's engagement with the document. Further, multiple users' engagement may be analyzed to make more global determinations and decisions with respect to the document. These engagement signals can, therefore, provide insights into user interaction with documents, and insights into the individual documents. These insights may be used to make recommendations on improving the documents, determinations about the user's role within a document, determinations about sending notifications to users, and more.

Figure 1:
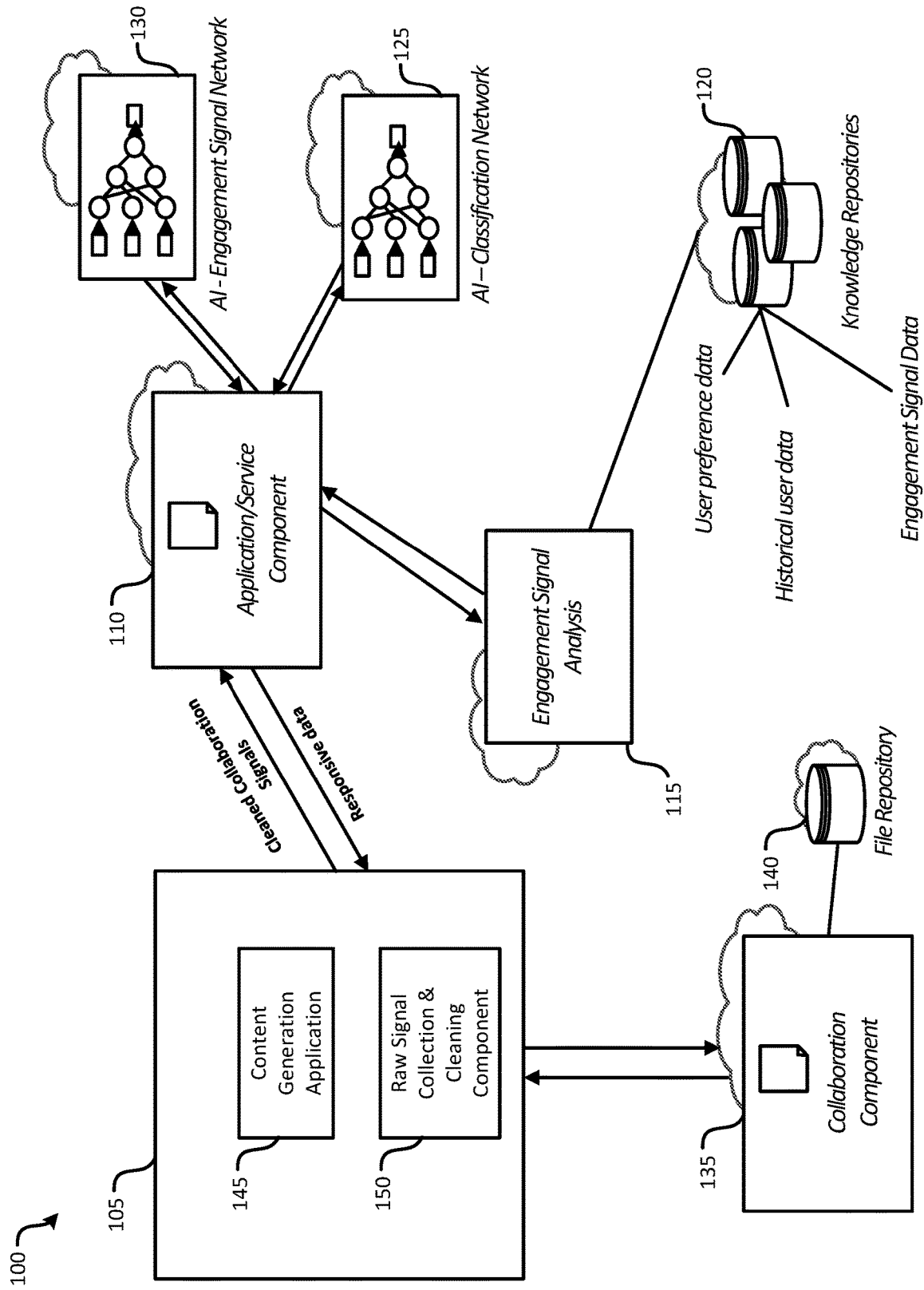
FIG. 1 illustrates an exemplary system for generating and analyzing engagement signals, according to some embodiments.

FIG. 1 illustrates an exemplary system 100 for generating and analyzing engagement signals. System 100 may include a user device 105, application service component 110, engagement signal network 130, classification network 125, engagement signal analysis component 115, knowledge repositories 120, collaboration component 135, and file repository 140. System 100 may include more or fewer components than discussed here, and/or the functionality described with respect to system 100 may reside within more or fewer computing systems without departing from the scope of this description.

Figure 8:
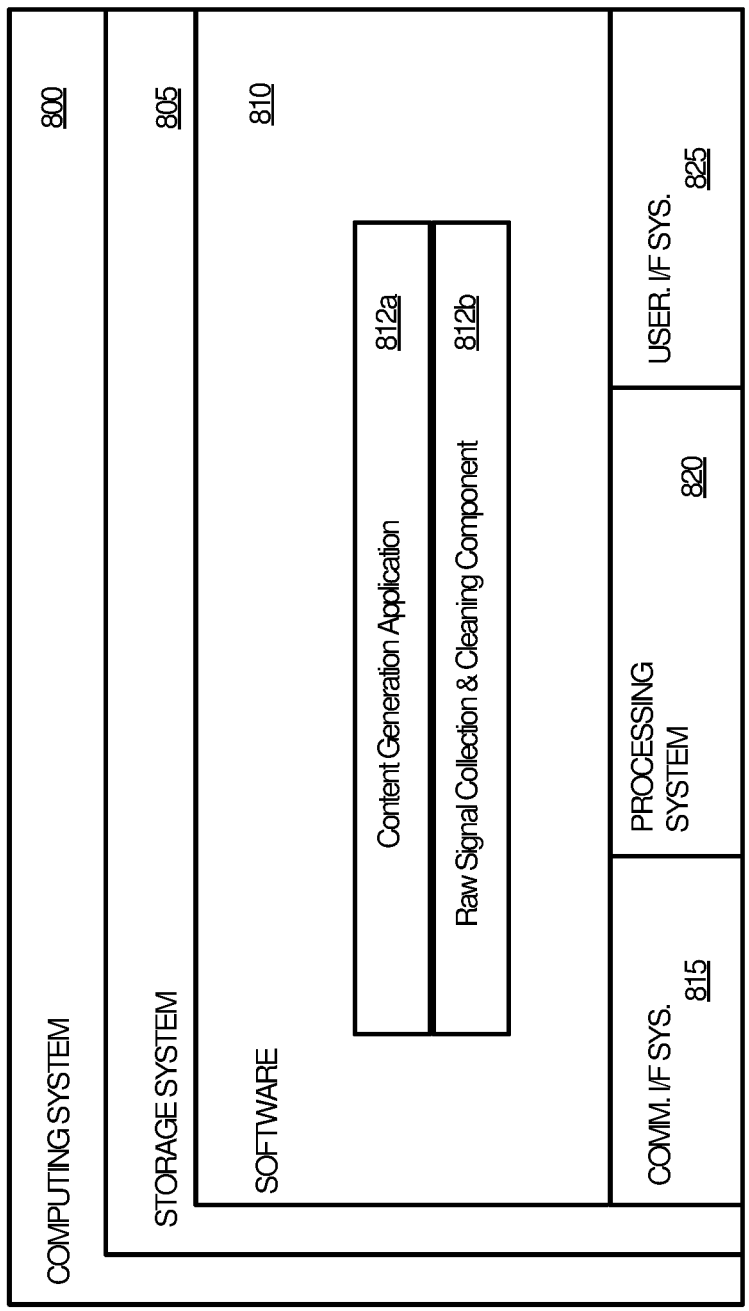
FIG. 8 illustrates a computing system.

User device 105 may be any suitable computing system, such as computing system 800 as described with respect to FIG. 8. For example, user device 105 may be a laptop, desktop, smartphone, tablet, or the like. While only a single user device 105 is depicted in FIG. 1, any number of user devices 105 may be included in system 100. User device 105 may include content generation application 145 and raw signal collection and cleaning component (C&C Component) 150. Each of these components may include instructions stored in memory that are executed by a processor of the user device 105. While only two components are depicted, the functionality described may be included in more or fewer components than is described without departing from the scope of this description. Further, user device 105 may have many other components and features not described here for the sake of brevity.

Content generation application 145 may be any content creation application including, for example, a word processing application (e.g., MICROSOFT WORD®), a presentation creation application (e.g., MICROSOFT POWERPOINT®), or any other content creation application (e.g., MICROSOFT EXCEL®, MICROSOFT ONENOTE®, MICROSOFT OUTLOOK®, MICROSOFT PUBLISHER®, MICROSOFT PROJECT®, or the like). The user may use the content generation application 145 to access one or more documents that may be collaboratively accessed in, for example a cloud environment. For example, the user may use the content generation application 145 to access files in the file repository 140 via the collaboration component 135. In some embodiments, the documents may be stored locally instead of or in addition to in the file repository 140. Files stored in the file repository 140 may be collaboratively accessed by many users using many user devices 105 via the collaboration component 135. While interacting with documents, whether in the file repository 140 or stored locally in a memory of the user device 105, the user's engagement may generate various signals. For example, while working in the document, raw signals related to the document window being opened, closed, minimized, maximized, and gaining focus may be generated. The document may also generate signals such as document open, document close, document selection, and so forth. Additionally, raw editing signals may be generated such as keyboard strokes, mouse clicks, and other input device activities. Many other raw signals may be generated from interacting with a document, all of which are not listed here for the sake of brevity. Any interaction or engagement with the document may generate a raw signal. The raw signals may be noisy. In other words, many raw signals may be generated that may not provide a lot of value with respect to the engagement of the user, while other raw signals may be very relevant. The value or relevance of a raw signal may vary based on the type of interaction the user is engaging in. For example, each keystroke may be more relevant in a reviewing engagement interaction than in an editing interaction where there are many keystroke signals.

The raw signal collection and cleaning component (C&C component) 150 may collect the raw signals from the user's engagement with the document. The C&C component 150 may clean the raw signals to generate cleaned collaboration signals. For example, the C&C component 150 may analyze the raw signals to extract signals that are determined to be not relevant for determining the user's engagement. In some embodiments, a machine learning algorithm or neural network may be used to clean the raw signals to generate the cleaned collaboration signals. The cleaned collaboration signals represent a noise-reduced view of the user's engagement with the document. As previously mentioned, the type of engagement interaction may inform the relevance of individual signals, which may be learned by the C&C component 150.

The application service component 110 may be cloud based. The application service component 110 may reside on a cloud-based server computing device, for example. The computing device may be any type of computing device such as, for example, computing device 800 as described with respect to FIG. 8. The application service component 110 may be a component that serves as an interface to the engagement signal creation, classification, and analysis components. The C&C component 150 may transmit the cleaned collaboration signals to the application service component 110. In some embodiments, the raw signals may be transmitted rather than cleaned collaboration signals, however the cleaned collaboration signals may be more efficient to transmit due to removal of the noise in the signals. The application service component 110 may transmit the cleaned collaboration signals to the engagement signal network 130.

The engagement signal network 130 may be a neural network or other advanced intelligence ("AI") component. The engagement signal network 130 may reside on a cloud-based server computing device, for example. The computing device may be any type of computing device such as, for example, computing device 800 as described with respect to FIG. 8. The engagement signal network 130 may analyze the cleaned collaboration signals to create engagement signals. For example, the engagement signal network 130 may identify boundary signals within the cleaned collaboration signals that indicate the beginning and/or end of an engagement event of the user. For example, maximizing the window may indicate the beginning of an engagement and minimizing or closing the window may indicate the end of the engagement. The engagements may be based in part on time. For example, the engagements may be approximately fifteen minutes (or any other time period), such that the engagement signal network 130 may look for boundary signals that fall approximately within a determined time period. Boundary signals may be identified using modeling, classification, vector analysis, or any other methodology. Upon identifying the boundary signals from the cleaned collaboration signals, the other cleaned collaboration signals that fall within the boundary signals may be grouped together to form an engagement signal. In other words, an engagement signal may include several cleaned collaboration signals that all fall within the boundary signal markers. In some embodiments, the engagement signal network 130 may further clean up noise in the cleaned collaboration signals by removing some of the cleaned collaboration signals from the engagement signals, even if the cleaned collaboration signal falls within the boundary signals. The engagement signal may represent an engagement event. For example, a collection of the cleaned collaboration signals that are grouped together into the engagement signal may include signals that indicate the user was editing the document during the engagement event.

In some embodiments, the application service component 110 may prepare the cleaned collaboration signals to provide them to the engagement signal network 130 in a format that can be used as input to the engagement signal network 130. The engagement signal network 130 may provide, in response, the results or output of the engagement signal network 130. The output may be the engagement signals (e.g., the boundary signals with the cleaned collaboration signals that are included with the engagement signal). In some embodiments, the output may be the boundary signals, which the application service component 110 may then use to generate the engagement signals by adding the cleaned collaboration signals that fall within the boundary signals.

The application service component 110 may provide the engagement signals to the classification network 125. The classification network 125 may reside on a cloud-based server computing device, for example. The computing device may be any type of computing device such as, for example, computing device 800 as described with respect to FIG. 8. The classification network 125 may classify the engagement signals based on the type of engagement indicated by the cleaned collaboration signals that make up the engagement signal. The classification network 125 may be a neural network or other AI component. The classification network 125 may receive the engagement signals from the application service component 110 and analyze the engagement signals by, for example, analyzing the cleaned collaboration signals in the engagement signal. The collection of cleaned collaboration signals may indicate a type of engagement event for the engagement signal. For example, the cleaned collaboration signals may indicate the user was reviewing the document (e.g., there were mouse clicks, scrolling, and keep alive engagements, but little editing), editing the document (e.g., there were a great deal of keyboard strokes and/or other interactions that caused changes in the document), unengaged with the document (e.g., there were few signals, indicating the user was not engaged), or some other type of engagement. The engagement signal types are not limited by those listed here, as any type of engagement may be defined and classified by the classification network 125. The classification network 125 may use modeling, vector analysis, a classification neural network, or any other methodology to classify the engagement signals. The output of the classification network 125 may include an engagement type for each engagement signal.

The application service component 110 may receive the output from the classification network 125 and provide the engagement signals as well as the engagement signal type to the engagement signal analysis component 115. The engagement signal analysis component 115 may reside on a cloud-based server computing device, for example. The computing device may be any type of computing device such as, for example, computing device 800 as described with respect to FIG. 8. The knowledge repositories 120 may be storage devices including computing devices that contain a memory or database, rack storage, cloud storage, or any other appropriate storage mechanism. The engagement signal analysis component 115 may further process the engagement signals to make decisions or perform other tasks associated with the document. The engagement signal analysis component 115 may use other information from the knowledge repositories 120, including user preference data, historical user data, engagement signal data, and the like, to further process the engagement signals. The engagement signal analysis component 115 may include a machine learning component, neural network, and/or any other advanced intelligence functionality. The engagement signal analysis component 115 may use any number of methodologies to analyze the engagement signals to generate any relevant or requested information or insights. For example, the engagement signals may be analyzed by the engagement signal analysis component 115 to assign a collaboration role to the user. As an example, if the user's interaction with the document resulted in twenty engagement signals, each having an engagement type, the twenty engagement signals may be used to determine if the user is, for example, an editor, author, reviewer, or has some other collaboration role with respect to the document. This collaboration role may be assigned and stored in the knowledge repositories 120 or in the file repository 140 and reported to the user and other collaboration users of that document as described in more detail with respect to FIGS. 4-7.

Note that the discussion above is with respect to a single user of a single document. The user's interactions with documents may result in engagement signal creation for any number of documents in the file repository 140. Further, any one document may be accessed by many users, such that the document may have engagement signals generated for many users. In some embodiments, collaboration roles may be generated for each user of the document that generates engagement signals for that document.

In addition to engagement signals for a single user being analyzed for a document, the engagement signals for multiple users may be analyzed for a document. In such cases, other decisions and/or information may be generated for a user or users of the document. For example, if the engagement signals from a number of users indicate that many users leave a document after reaching a certain paragraph or page, that behavior may indicate that the information contained in the document is boring, complex, offensive, or otherwise difficult to continue engaging with. Such information may be shared with the user, as discussed with respect to the user interfaces described with respect to FIGS. 4-7.

Figure 2:
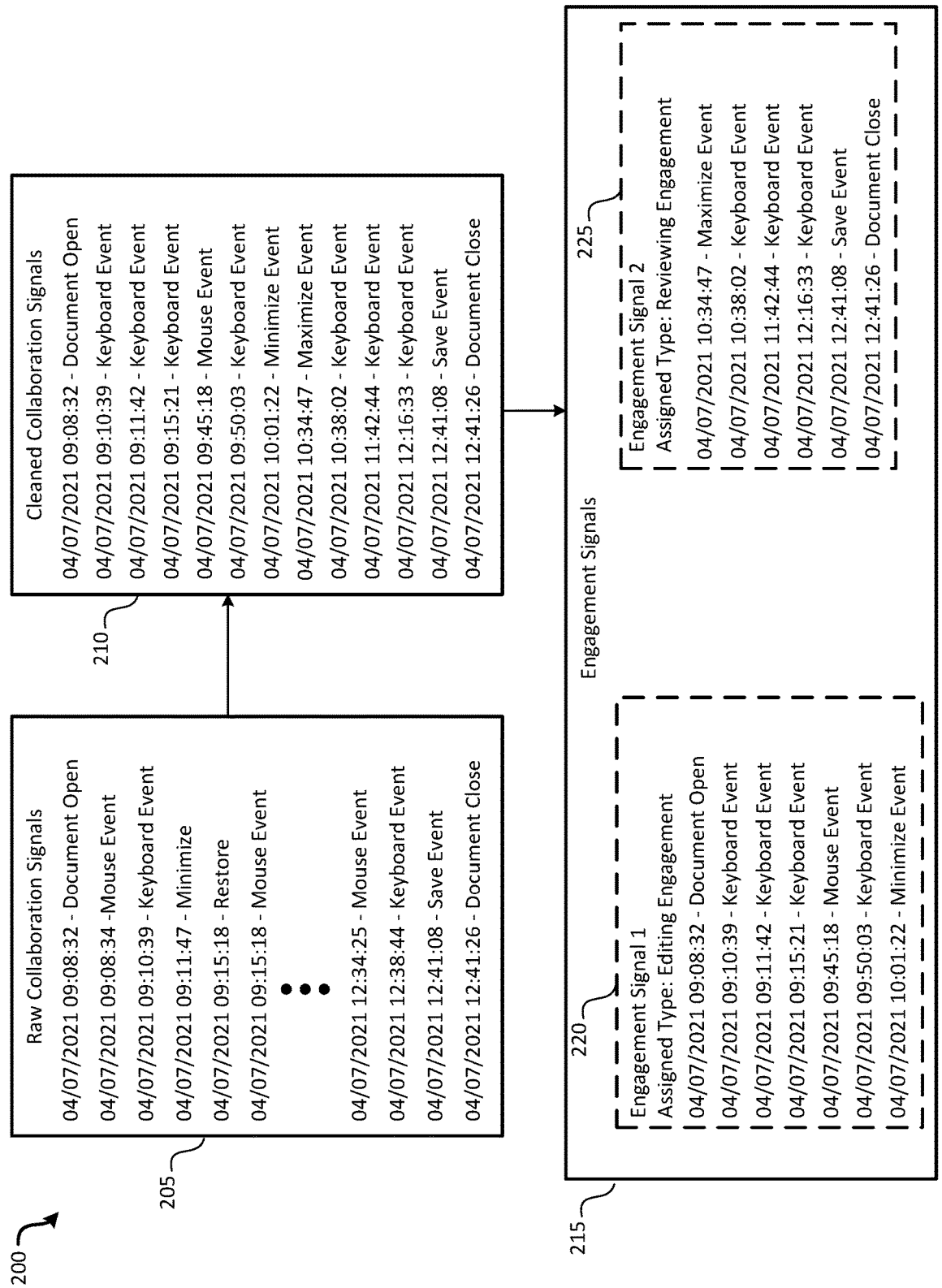
FIG. 2 illustrates an exemplary flow or transformation of raw signals to engagement signals, according to some embodiments.

FIG. 2 illustrates an exemplary flow 200 of raw collaboration signals to engagement signals. As shown in the flow 200, raw collaboration signals 205 are generated by a user interacting with a document. The raw collaboration signals 205 listed are exemplary only for the purposes of describing an example of such signals. The raw collaboration signals 205 are collected by the C&C component 150 as described with respect to FIG. 1. The C&C component 150 may clean the raw collaboration signals 205 to generate the cleaned collaboration signals 210. The cleaned collaboration signals 210 may have any raw collaboration signals 205 removed that are deemed to be noise or otherwise not relevant or necessary to making an engagement signal and analysis. The depicted cleaned collaboration signals 210 are exemplary only for the purpose of describing an example of such signals. The cleaned collaboration signals 210 are sent to the application service component 110, which transmits the cleaned collaboration signals 210 (or an input that represents the cleaned collaboration signals 210 such as a vector or other representation) to the engagement signal network 130. The engagement signal network 130 may identify boundary signals from the cleaned collaboration signals 210. The cleaned collaboration signals 210 that fall within the boundary signals are grouped together to form the engagement signals 215. For example, the Document Open signal at 9:08:32 on Apr. 7, 2021 may be the beginning boundary signal and the minimize event at 10:01:22 on Apr. 7, 2021 may be the ending boundary signal for the first engagement signal 220. Accordingly, all cleaned collaboration signals 210 that fall between the boundary signals are grouped into the first engagement signal 220. The engagement signals 215 are exemplary only for the purposes of describing an example of such signals. A second engagement signal 225 may also be generated. While only two engagement signals 215 are shown, any number of engagement signals 215 may be generated. The engagement signals 215 may be provided to the classification network 125 to classify the engagement signals 215 into an engagement type. As examples, the first engagement signal 220 may be classified as an editing engagement, and the second engagement signal 225 may be classified as a reviewing engagement.

Figure 3:
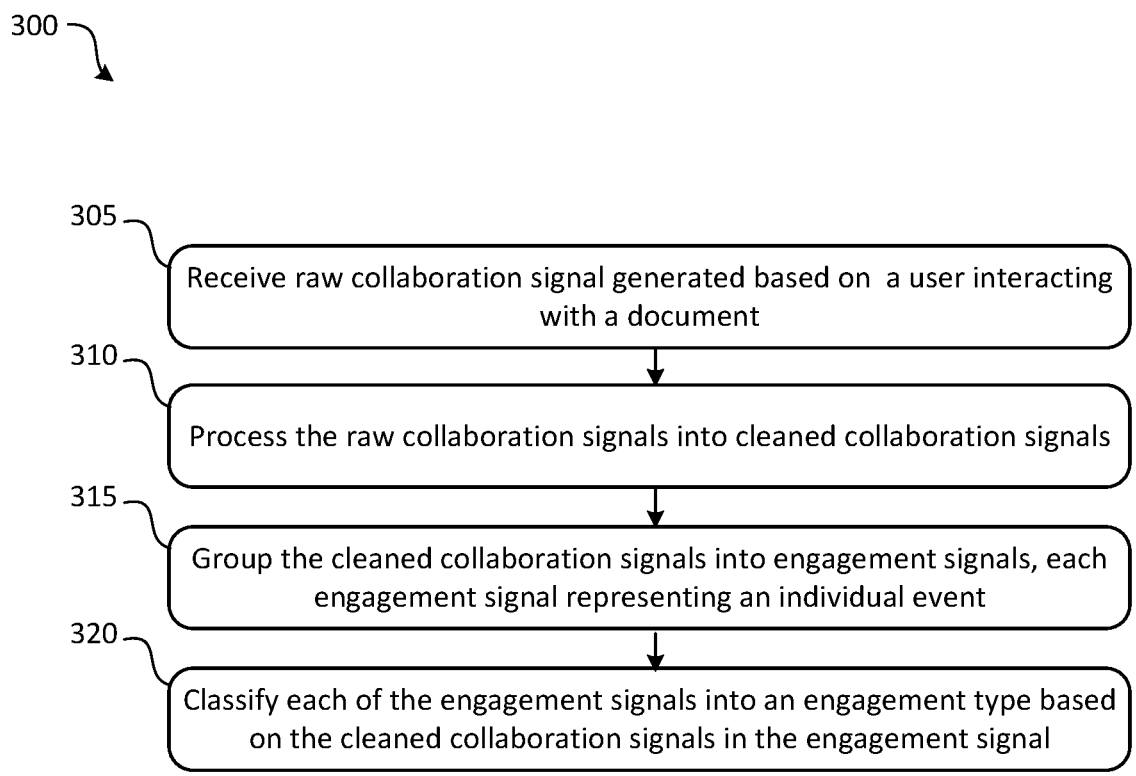
FIG. 3 illustrates an exemplary process of generating and analyzing engagement signals, according to some embodiments.

FIG. 3 illustrates an exemplary method 300 for generating and analyzing engagement signals. The method 300 may be performed by system 100 as described with respect to FIG. 1. The method 300 may begin with the C&C component 150 receiving raw collaboration signals generated based on a user interacting with a document at step 305. For example, the user of user device 105 may access a document from the file repository 140, which may generate the raw collaboration signals. The C&C component 150 may receive the signals.

The C&C component 150 may process the raw collaboration signals into cleaned collaboration signals. For example, the C&C component 150 may remove redundant, irrelevant, or other signals that represent noise. As shown in FIG. 2 as an example, the raw collaboration signals 205 may be processed by the C&C component 150 to generate the cleaned collaboration signals 210. The C&C component 150 may transmit the cleaned collaboration signals to the application service component 110.

The cleaned collaboration signals may be grouped into engagement signals, each engagement signal representing an individual event at step 315. For example, the application service component 110 may provide the cleaned collaboration signals as input to the engagement signal network 130. The engagement signal network 130 may take the cleaned collaboration signals and group the cleaned collaboration signals into engagement signals. For example, the engagement signal network 130 may receive the cleaned collaboration signals 210 and output boundary signals or groupings of the cleaned collaboration signals 210 to generate the engagement signals 215. The engagement signals may each represent an individual engagement event. For example, an engagement event may be editing, reviewing, authoring, viewing, or some other event. The types of engagement events are not limited by those listed here. Any engagement type may be defined and used to classify engagement signals. The overall engagement of a user may result in multiple engagement signals, and each engagement signal may represent a different type of event. For example, the user may have periods of reviewing, periods of viewing, periods of editing, and so forth.

At step 320, the engagement signals are classified into engagement types based on the cleaned collaboration signals in the engagement signal. For example, the engagement signals may be provided to the classification network 125 that classifies each engagement signal. The engagement signals may be classified into types such as a reviewing event, authoring event, editing event, and so forth.

Figure 4:
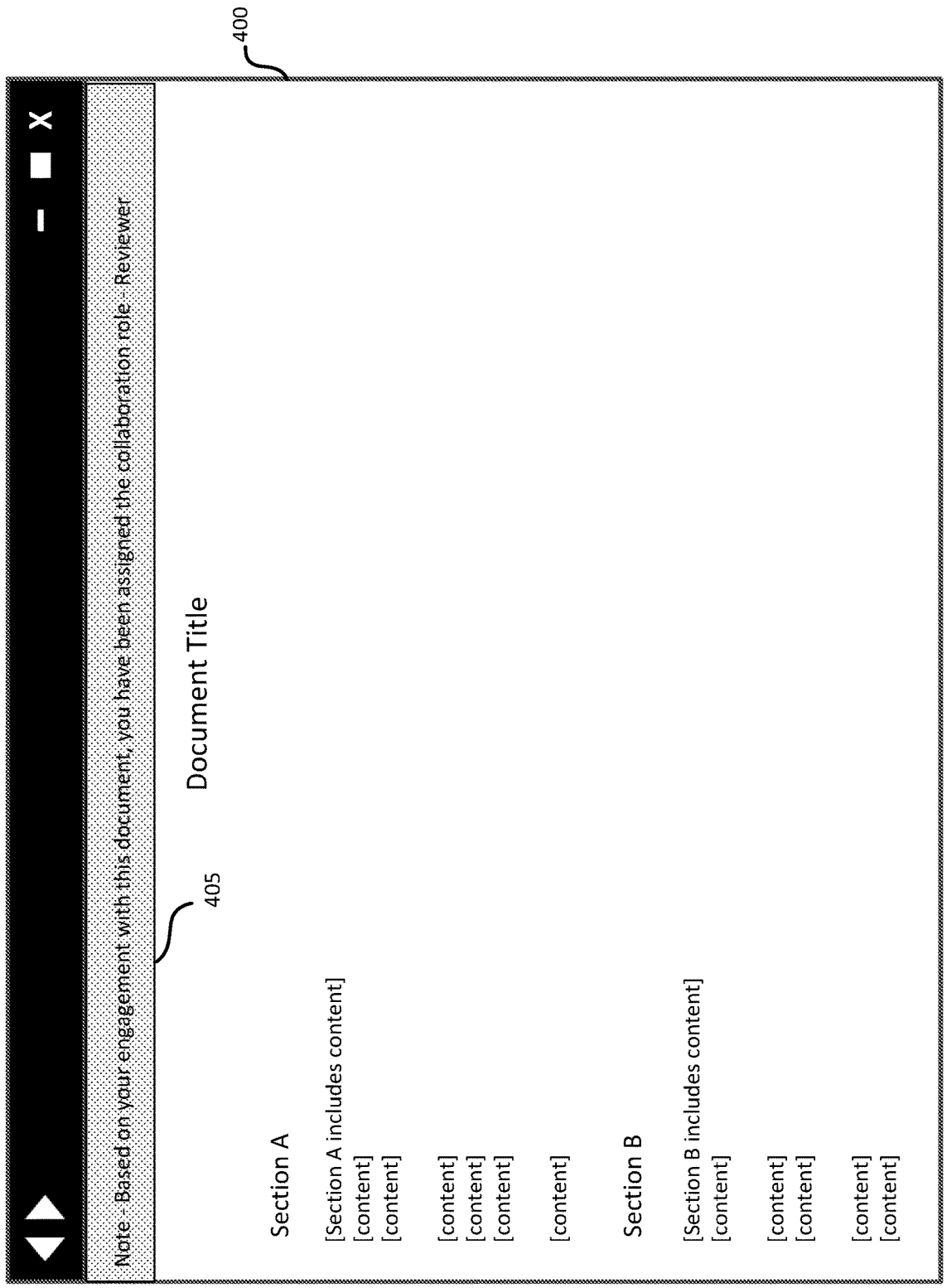
FIG. 4 illustrates an exemplary graphical user interface, according to some embodiments.

FIG. 4 illustrates an exemplary user interface 400. The user interface 400 may be, for example, provided with the content generation application 145 for interacting with documents. Upon interacting with the document shown, for example, the interaction may generate raw collaboration signals, which are cleaned by the C&C component 150. The cleaned collaboration signals may be provided to the engagement signal network 130 that groups the cleaned collaboration signals into engagement signals. The engagement signals may be classified by the classification network 125. The engagement signal analysis component 115 may analyze the engagement signals to determine that the collaboration role of the user is, for example, a "Reviewer." Accordingly, the next time the user opens the document, the note 405 may appear to notify the user that he or she has been assigned the collaboration role Reviewer. The role may be determined based on the engagement signals. For example, a score or weighted score may be assigned to the engagement signals to determine the collaboration role or the most engagement signals may be used. For example, if fifteen of twenty engagement signals are classified as reviewing events, the user may be assigned the reviewer collaboration role. In some embodiments, a score may be assigned to each type of collaboration signal, and the total score may be used to assign the collaboration role. In some embodiments, certain types of collaboration signals may be weighted to generate the score. For example, signals that indicate more focused activity may have a higher weight such as input activity (e.g., keyboard strokes). As another example, activities that occur in rapid succession over a short period may indicate more focused activity and be weighted higher such as several scrolling activities plus keyboard strokes all occurring within a few seconds may suggest the user is reading carefully and editing. While any formula may be used to assign the collaboration role, and this description is not limited to a single formula. The insight into the engagement with the document by each user is at least a portion of the value added by this analysis.

Figure 5:
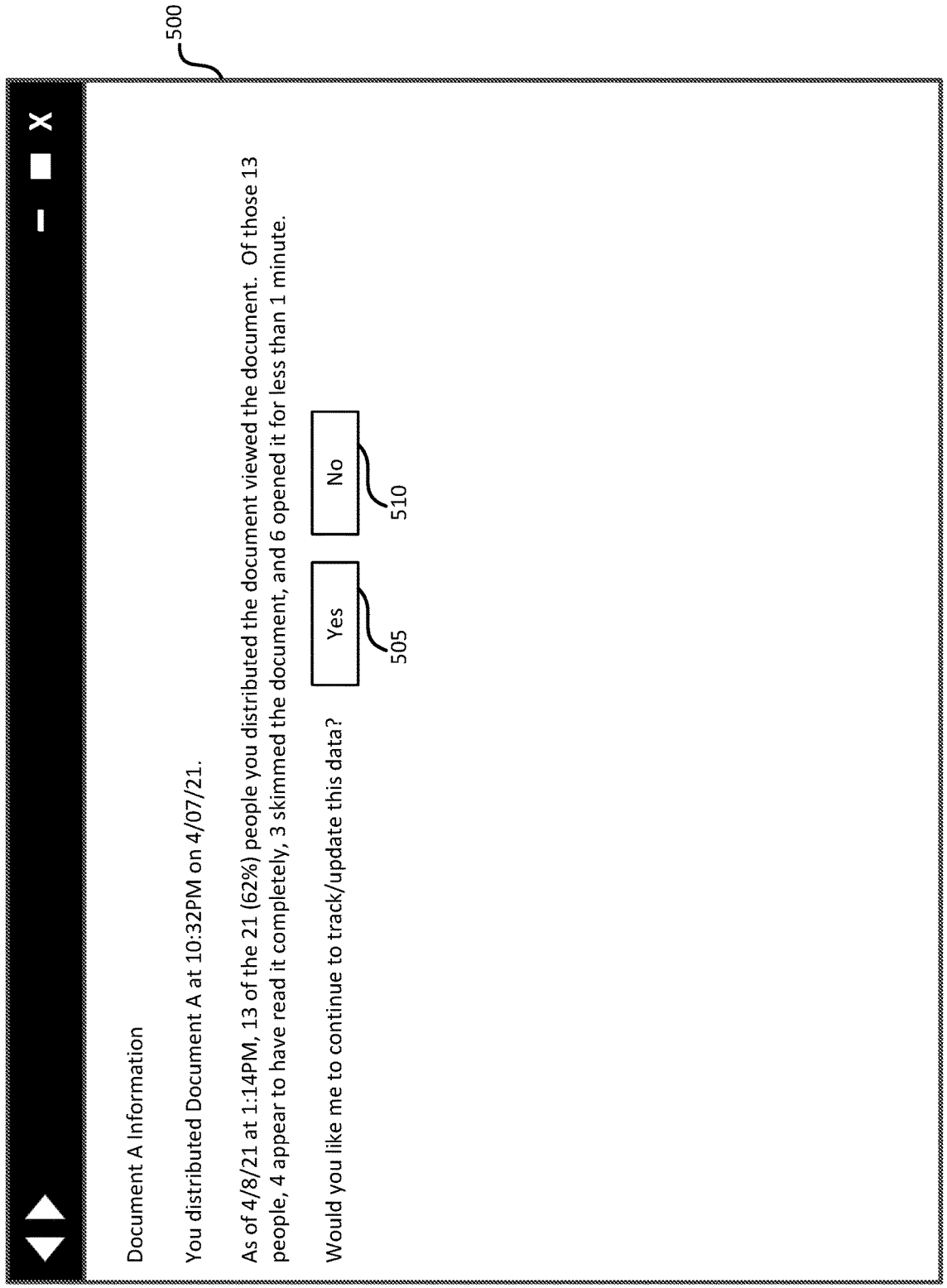
FIG. 5 illustrates another exemplary graphical user interface, according to some embodiments.

FIG. 5 illustrates an exemplary user interface 500. The user interface 500 may be, for example, provided with the content generation application 145 for interacting with documents. Upon interacting with Document A, each user may generate raw collaboration signals, which are cleaned by the C&C component 150 on the user's respective user device 105. The cleaned collaboration signals may be provided to the engagement signal network 130 that groups the cleaned collaboration signals into engagement signals. The engagement signals may be classified by the classification network 125. The engagement signal analysis component 115 may analyze the engagement signals and their classifications for each of the users to make determinations or generate analysis about the collective group of users' experiences with the document. In the example shown, the authoring user distributed Document A at 10:32 PM on Apr. 7, 2021. Document A may be, for example, material that was sent out to a group of users for review prior to a meeting to discuss ideas included in the material. The authoring user may have requested the reported information be tracked and analyzed, or the information may be automatically tracked and analyzed without user request. As an example, the information may report that as of the current date and/or time or as of the last recorded interaction, in the example as of 1:14 PM on Apr. 8, 2021, 13 of the 21 people to which the document was distributed had viewed the document. Deeper information may be provided as well, such as that four appear to have read Document A completely, three skimmed the document, and six opened it for less than one minute. This type of insight may allow the authoring user to determine how to approach the upcoming meeting, for example. If there is additional time before the meeting, for example, the authoring user may send out an email notice to the recipients asking them to be sure to read Document A. As another example, the authoring user may determine that since so few of the people appear to have prepared for the meeting, some of the initial portion of the meeting may be needed to discuss the material and provide more background than if the users were properly prepared. This type of insight may be valuable and just one other way the engagement signals may be useful to the authoring user of the document. Further, the user interface 500 may allow the authoring user to stop tracking and analyzing this information or continue by providing a yes button 505 to continue tracking and updating the information as well as a no button 510 to stop tracking and updating the information. It may be beneficial to ensure this type of tracking and analyzing is only completed where desired to reduce unnecessary traffic on the network and other resource usage needed to generate the analysis.

FIG. 6 illustrates an exemplary user interface 600. The user interface 600 may be, for example, provided with the content generation application 145 for interacting with documents. Upon interacting with Document B, each user may generate raw collaboration signals, which are cleaned by the C&C component 150 on the user's respective user device 105. The cleaned collaboration signals may be provided to the engagement signal network 130 that groups the cleaned collaboration signals into engagement signals. The engagement signals may be classified by the classification network 125. The engagement signal analysis component 115 may analyze the engagement signals and classifications for each of the users to make determinations or generate analysis about the collective group of users' experiences with the document. In the example shown, the authoring user distributed Document B at 9:15 AM on Apr. 6, 2021. Document B may be, for example, a presentation slide deck. The recommendations shown may be provided to an authoring user, a contributing user, or any other user of the document. In some embodiments, recommendations may be provided to users with appropriate permissions. For example, a contributor may have permissions to receive recommendations while a user that does not contribute may not have such permissions. As shown in FIG. 6, the engagement signal analysis component 115 determined that thirty-seven people engaged with Document B since its distribution and generated recommendations based on the analysis. The recommendations are examples of the types of recommendations that may be generated based on analysis of engagement signals and their classified type. For example, the engagement signal analysis component 115 may determine that thirty-one percent of the users exited the document after reaching slide 3. This indicates that there may be an issue with the content of slide 3, and the engagement signal analysis component 115 may make determinations or recommendations based on this analysis. For example, the engagement signal analysis component 115 may recommend that slide 3 be modified. For example, the content may be too complex, too boring, or in some way offensive or otherwise unpleasant for the users to continue to engage with Document B. Engagement signal analysis component 115 may be a machine learning or other advanced intelligence component that may have the ability to determine some information about the content of slide 3 to make further recommendations. In the example shown, the analysis indicates the data on slide 3 may be offensive because it contains opinions, and opinions may generate distaste due to other users disagreeing with the opinion, for example. As such, the recommendation may be to revise the slide to use less opinion and include more factual data. The analysis may also determine, for example, that fifteen percent of viewers spend more than ten minutes on slide 6. A reason for extensive time on a slide may simply be distraction, but when many users get stuck in the same place, it may indicate that the information on the slide is too complex. Accordingly, an example recommendation may be to modify the slide to provide more detail to help the users understand the content, spread the content out, or otherwise simplify the content. Further, the user interface 600 may allow the authoring user to stop tracking and analyzing this information about Document B. Accordingly, a yes button 605 to continue tracking and updating the data may be provided as well as a no button 610 to stop tracking and updating the data may be provided. To avoid unnecessary traffic on the network and resource use, stopping unnecessary tracking and analysis may be beneficial.

Figure 7:
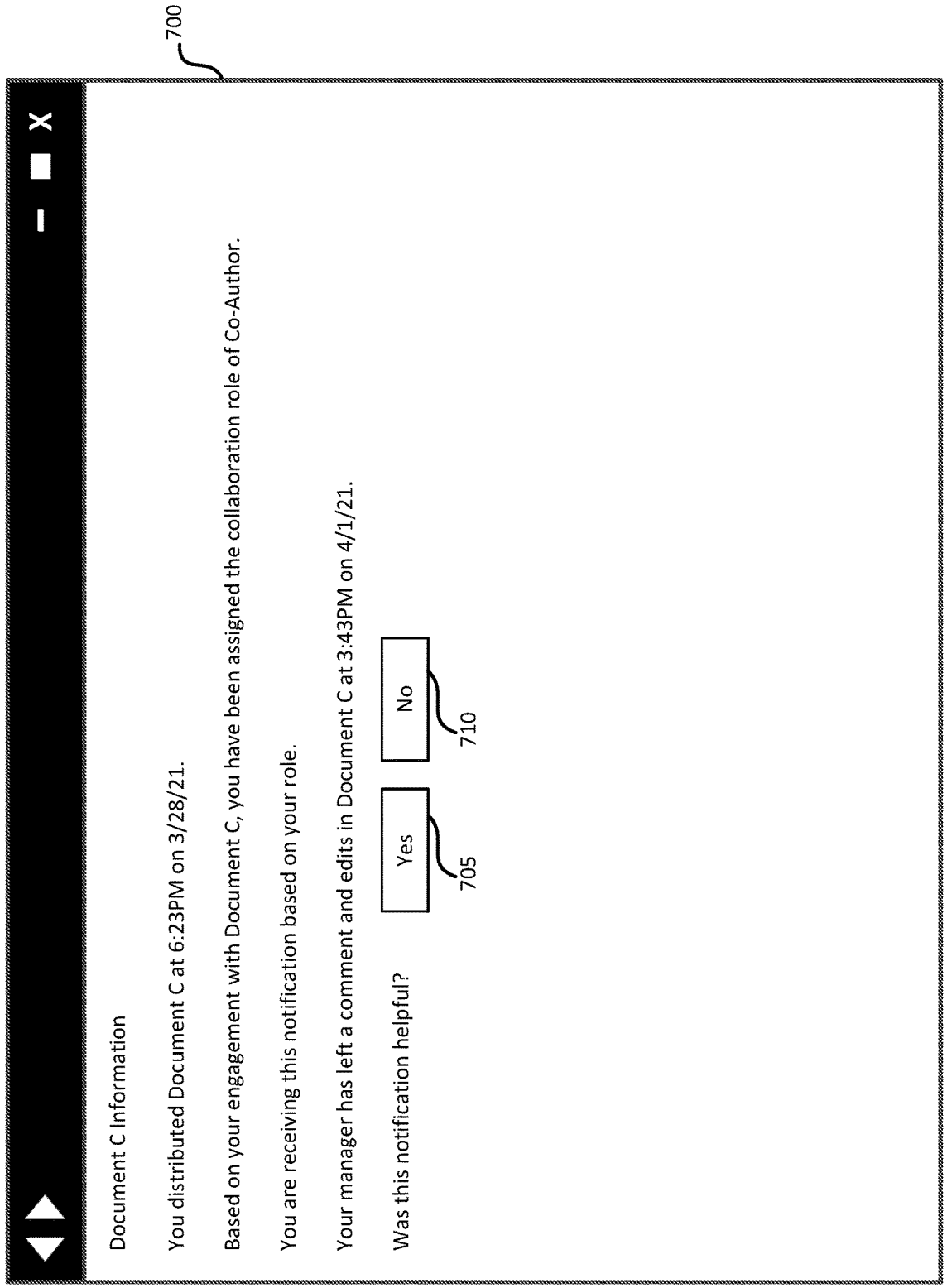
FIG. 7 illustrates yet another exemplary graphical user interface, according to some embodiments.

FIG. 7 illustrates an exemplary user interface 700. The user interface 700 may be, for example, provided with the content generation application 145 for interacting with documents. In some embodiments, the user interface 700 may be a popup notification, an email notification, a text message notification, or the like. Upon interacting with Document C, a user may be assigned a collaboration role, as was previously discussed. Another exemplary use of the engagement signals may be to provide notifications to users based on the user's engagement, other users' engagement, relationships between the users, and/or the like. For example, a user that has been assigned the collaboration role of Co-Author may have a vested interest in Document C. Despite the user typically preferring not to receive notifications, if the user's manager leaves a comment and/or edits in the document, the user may prefer to receive a notification. Accordingly, in the example, the user may receive the notification that the user's manager has left a comment and edits as well as telling the user he has been assigned a Co-Author collaboration role. The user interface 700 may also ask the user whether the notification was helpful and provide a yes button 705 and a no button 710 for the user to respond. The response may be stored, for example, in the knowledge repositories 120 for making future decisions regarding notifications for this and/or other users.

FIGS. 4-7 provide user interfaces that describe some examples of the types of uses, determinations, and recommendations generated based on the generated engagement signals. However, these are examples only, and the engagement signals that are generated based on user interactions with documents are not limited to the uses described herein. Rather, the engagement signals may be generated and analyzed to provide a wide range of insights to users to make their collaboration experiences deeper, more effective, and otherwise more useful.

FIG. 8 illustrates a computing system 800 suitable for implementing processing operations described herein related to automatic intelligent content generation, with which aspects of the present disclosure may be practiced. As referenced above, computing system 800 may be configured to implement processing operations of any component described herein including the user system components (e.g., content generation application 145, C&C component 150, application service components 110 of FIG. 1). As such, computing system 800 may be configured as a specific purpose computing device that executes specific processing operations to solve the technical problems described herein including those pertaining to generation of intelligent content for users based on limited text inputs of the user. Computing system 800 may be implemented as a single apparatus, system, or device or may be implemented in a distributed manner as multiple apparatuses, systems, or devices. For example, computing system 800 may comprise one or more computing devices that execute processing for applications and/or services over a distributed network to enable execution of processing operations described herein over one or more applications or services. Computing system 800 may comprise a collection of devices executing processing for front-end applications/services, back-end applications/service or a combination thereof. Computing system 800 comprises, but is not limited to, a processing system 820, a storage system 805, software 810, communication interface system 815, and user interface system 825. Processing system 820 is operatively coupled with storage system 805, communication interface system 815, and user interface system 825. Non-limiting examples of computer system 800 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 820 loads and executes software 810 from storage system 805. Software 810 includes one or more software components (e.g., 812a, 812b) that are configured to enable functionality described herein. In some examples, computing system 800 may be connected to other computing devices (e.g., display device, audio devices, servers, mobile/remote devices, VR devices, AR devices, etc.) to further enable processing operations to be executed. When executed by processing system 820, software 810 directs processing system 820 to operate as described herein for at least the various processes, operational scenarios, and sequences discussed in the foregoing implementations. Computing system 800 may optionally include additional devices, features, or functionality not discussed for purposes of brevity. Computing system 800 may further be utilized as user device 105 or any of the cloud computing systems in system 100 (FIG. 1), flowchart 200 (FIG. 2), method 300 (FIG. 3) and/or the accompanying description of FIGS. 4-7.

Referring still to FIG. 8, processing system 820 may comprise processor, a micro-processor and other circuitry that retrieves and executes software 810 from storage system 805. Processing system 820 may be implemented within a single processing device but may also be distributed across multiple processing devices or sub-systems that cooperate in executing program instructions. Examples of processing system 820 include general purpose central processing units, microprocessors, graphical processing units, application specific processors, sound cards, speakers and logic devices, gaming devices, VR devices, AR devices as well as any other type of processing devices, combinations, or variations thereof.

Storage system 805 may comprise any computer readable storage media readable by processing system 820 and capable of storing software 810. Storage system 805 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations, storage system 805 may also include computer readable communication media over which at least some of software 810 may be communicated internally or externally. Storage system 805 may be implemented as a single storage device but may also be implemented across multiple storage devices or sub-systems co-located or distributed relative to each other. Storage system 805 may comprise additional elements, such as a controller, capable of communicating with processing system 820 or possibly other systems.

Software 810 may be implemented in program instructions and among other functions may, when executed by processing system 820, direct processing system 820 to operate as described with respect to the various operational scenarios, sequences, and processes illustrated herein. For example, software 810 may include program instructions for executing one or more content generation applications 812a as described herein. Software 810 may also include program instructions for executing one or more Raw Signal Collection & Cleaning components 812b for collecting and cleaning the raw signals into cleaned collaboration signals, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 810 may include additional processes, programs, or components, such as operating system software, virtual machine software, or other application software. Software 810 may also comprise firmware or some other form of machine-readable processing instructions executable by processing system 820.

In general, software 810 may, when loaded into processing system 820 and executed, transform a suitable apparatus, system, or device (of which computing system 800 is representative) overall from a general-purpose computing system into a special-purpose computing system customized to execute specific processing components described herein as well as process data and respond to queries. Indeed, encoding software 810 on storage system 805 may transform the physical structure of storage system 805. The specific transformation of the physical structure may depend on various factors in different implementations of this description. Examples of such factors may include, but are not limited to, the technology used to implement the storage media of storage system 805 and whether the computer-storage media are characterized as primary or secondary storage, as well as other factors.

For example, if the computer readable storage media are implemented as semiconductor-based memory, software 810 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 815 may include communication connections and devices that allow for communication with other computing systems (not shown) over communication networks (not shown). Communication interface system 815 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 825 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 825. In some cases, the input and output devices may be combined in a single device, such as a display capable of displaying images and receiving touch gestures. The aforementioned user input and output devices are well known in the art and need not be discussed at length here.

User interface system 825 may also include associated user interface software executable by processing system 820 in support of the various user input and output devices discussed above. Separately or in conjunction with each other and other hardware and software elements, the user interface software and user interface devices may support a graphical user interface, a natural user interface, or any other type of user interface, for example, that enables front-end processing and including rendering of, for example, user interfaces 400-700. Exemplary applications/services may further be configured to interface with processing components of computing system 800 that enable output of other types of signals (e.g., audio output, handwritten input) in conjunction with operation of exemplary applications/services (e.g., a collaborative communication application/service, electronic meeting application/service, etc.) described herein.

Communication between computing system 800 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method for generating and analyzing engagement signals, the method comprising:
   for each user of a plurality of users:
      receiving raw collaboration signals generated based on the respective user interacting with a document,
      processing the raw collaboration signals into cleaned collaboration signals,
      grouping the cleaned collaboration signals into engagement signals, each engagement signal representing an individual event, wherein the grouping comprises identifying boundary signals for the individual events with a neural network configured to identify the boundary signals, the identifying comprising:
         ingesting, by the neural network, the cleaned collaboration signals; and
         outputting, from the neural network, the boundary signals that indicate a beginning and end of the individual events, and
      classifying each of the engagement signals into one of a plurality of engagement types based on the cleaned collaboration signals in the respective engagement signal;
   generating a collaboration insight comprising collaboration information generated at least in part from the engagement signals of a first user of the plurality of users; and
   causing to display, on a display of a computing device of a second user of the plurality of users, a graphical user interface comprising the collaboration insight.

2. The computer-implemented method of claim 1, wherein the raw collaboration signals comprise at least one of document open signals, window minimize signals, window focus signals, document close signals, window maximize signals, input activity signals, or a combination thereof.

3. The computer-implemented method of claim 1, wherein processing the raw collaboration signals into the cleaned collaboration signals comprises aggregating the raw collaboration signals to remove noise.

4. The computer-implemented method of claim 1, wherein the grouping the cleaned collaboration signals into the engagement signals comprises:
   combining the cleaned collaboration signals occurring between the boundary signals into the respective engagement signal.

5. The computer-implemented method of claim 1, further comprising:
   analyzing the classified engagement signals of the plurality of users; and
   classifying content of the document based at least in part on the analyzing.

6. The computer-implemented method of claim 1, wherein the classifying each of the engagement signals into the one of the plurality of engagement types comprises:
   providing each of the engagement signals into an intelligence classifier; and
   receiving an engagement type as output from the intelligence classifier for each of the engagement signals.

7. The computer-implemented method of claim 1, wherein the engagement types comprise editing, viewing, reviewing, and authoring.

8. The computer-implemented method of claim 1, further comprising:
   assigning a collaboration role to the first user for the document based on the classified engagement signals.

9. The computer-implemented method of claim 1, further comprising:
   providing recommendations to a contributor of the document based on analyzing the classified engagement signals of the plurality of users of the document.

10. The computer-implemented method of claim 1, further comprising:
    sending a notification of an action related to the document to one of the plurality of users of the document based at least in part on the classified engagement signals.

11. A system comprising:
    one or more processors; and
    a memory having stored thereon instructions that, upon execution by the one or more processors, cause the one or more processors to:
      for each user of a plurality of users:
         receive raw collaboration signals generated based on the respective user interacting with a document;
         process the raw collaboration signals into cleaned collaboration signals;
         group the cleaned collaboration signals into engagement signals, each engagement signal representing an individual event, wherein the instructions to group comprises further instructions to identify boundary signals for the individual events with a neural network configured to identify the boundary signals, the instructions to identify comprising further instructions to:
            ingest, by the neural network, the cleaned collaboration signals, and
            output, from the neural network, the boundary signals that indicate a beginning and end of the individual events; and
         classify each of the engagement signals into one of a plurality of engagement types based on the cleaned collaboration signals in the respective engagement signal,
      generate a collaboration insight comprising collaboration information generated at least in part from the engagement signals of a first user of the plurality of users, and
      cause to display, on a display of a computing device of a second user of the plurality of users, a graphical user interface comprising the collaboration insight.

12. The system of claim 11, wherein the raw collaboration signals comprise at least one of document open signals, window minimize signals, window focus signals, document close signals, window maximize signals, input activity signals, or a combination thereof.

13. The system of claim 11, wherein the instructions to process the raw collaboration signals into the cleaned collaboration signals comprises instructions that, upon execution by the one or more processors, cause the one or more processors to aggregate the raw collaboration signals to remove noise.

14. The system of claim 11, wherein the instructions to group the cleaned collaboration signals into the engagement signals comprise further instructions that, upon execution by the one or more processors, cause the one or more processors to:

combine the cleaned collaboration signals occurring between the boundary signals into the respective engagement signal.

15. The system of claim 11, wherein the instructions comprise further instructions that, upon execution by the one or more processors, cause the one or more processors to:

analyze the classified engagement signals of the plurality of users; and classify content of the document based at least in part on the analysis.

16. The system of claim 11, wherein the instructions to classify each of the engagement signals into the one of the plurality of engagement types comprises instructions that, upon execution by the one or more processors, cause the one or more processors to:

provide each of the engagement signals into an intelligence classifier; and receive an engagement type as output from the intelligence classifier for each of the engagement signals.

17. The system of claim 11, wherein the engagement types comprise editing, viewing, reviewing, and authoring.

18. The system of claim 11, wherein the instructions comprise further instructions that, upon execution by the one or more processors, cause the one or more processors to:

assign a collaboration role to the first user for the document based on the classified engagement signals.

19. The system of claim 11, wherein the instructions comprise further instructions that, upon execution by the one or more processors, cause the one or more processors to:

provide recommendations to a contributor of the document based on analyzing the classified engagement signals of the plurality of users of the document.

20. The system of claim 11, wherein the instructions comprise further instructions that, upon execution by the one or more processors, cause the one or more processors to:

send a notification of an action related to the document to one of the plurality of users of the document based at least in part on the classified engagement signals.

* * * * *